(12) United States Patent
Zhou et al.

(10) Patent No.: US 11,019,271 B2
(45) Date of Patent: May 25, 2021

(54) IMAGE SENSOR, CAMERA MODULE AND ELECTRONIC DEVICE

(71) Applicant: GUANGDONG OPPO MOBILE TELECOMMUNICATIONS CORP., LTD., Guangdong (CN)

(72) Inventors: Yibao Zhou, Guangdong (CN); Jiao Cheng, Guangdong (CN); Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/499,042

(22) PCT Filed: Apr. 13, 2018

(86) PCT No.: PCT/CN2018/083045
§ 371 (c)(1),
(2) Date: Sep. 27, 2019

(87) PCT Pub. No.: WO2018/201875
PCT Pub. Date: Nov. 8, 2018

(65) Prior Publication Data
US 2020/0045214 A1 Feb. 6, 2020

(30) Foreign Application Priority Data
May 3, 2017 (CN) .......................... 201710305888.3

(51) Int. Cl.
*H04N 5/235* (2006.01)
*H04N 5/225* (2006.01)
(Continued)

(52) U.S. Cl.
CPC .......... *H04N 5/235* (2013.01); *H04N 5/2254* (2013.01); *H04N 5/2257* (2013.01);
(Continued)

(58) Field of Classification Search
None
See application file for complete search history.

(56) References Cited

U.S. PATENT DOCUMENTS 10,419,588 B2 * 9/2019 Zhou .................... H04N 5/2351
2008/0303922 A1 * 12/2008 Chaudhri ............... H04N 5/235
348/231.99

(Continued)

FOREIGN PATENT DOCUMENTS

CN 101771816 A 7/2010
CN 102595030 A 7/2012
(Continued)

OTHER PUBLICATIONS

Extended European Search Report for European Application No. 18794990.4 dated Feb. 21, 2020.
(Continued)

*Primary Examiner* — Quan Pham (57) ABSTRACT

An image sensor for an electronic device is provided. The image sensor includes a pixel array and a control circuit. The pixel array includes a light sensing area and an imaging area. The control circuit is coupled to the light sensing area and configured to receive a first instruction to control the light sensing area to detect an illumination intensity, and to receive a second instruction to control the light sensing area and the imaging area to sense light together, so as to acquire an image. A camera module and an electronic device are also provided.

16 Claims, 6 Drawing Sheets

(51) Int. Cl.
*H04M 1/02* (2006.01)
*H04N 5/369* (2011.01)

(52) U.S. Cl.
CPC ......... *H04N 5/2258* (2013.01); *H04N 5/3696* (2013.01); *H04M 1/0264* (2013.01)

(56) References Cited

U.S. PATENT DOCUMENTS

| | | |
|---|---|---|
| 2012/0092541 A1 | 4/2012 | Tuulos et al. |
| 2015/0116535 A1* | 4/2015 | Wu ..................... H04N 9/735 348/224.1 |
| 2019/0075226 A1* | 3/2019 | Koishi ................... H04N 5/369 |

FOREIGN PATENT DOCUMENTS

| | | |
|---|---|---|
| CN | 202798942 U | 3/2013 |
| CN | 104539835 A | 4/2015 |
| CN | 105472209 A | 4/2016 |
| CN | 107222591 A | 9/2017 |
| CN | 107249109 A | 10/2017 |
| EP | 1227662 A2 | 7/2002 |
| GB | 2510227 A | 7/2014 |
| WO | 2016019116 A1 | 2/2016 |
| WO | 2016159032 A1 | 10/2016 |

OTHER PUBLICATIONS

ISR with English translation for PCT application PCT/CN20181083045 dated Nov. 8, 2018.
OA with English translation for CN application 201710305888.3 dated Apr. 3, 2019.
English translation of CN OA for CN application 201710305888.3 mailed Apr. 29, 2020.
Examination for EP application 18794990.4 dated Oct. 5, 2020.
Indian Examination Report for IN Application 201917040485 dated Jan. 19, 2021. (6 pages).

\* cited by examiner

IMAGE SENSOR, CAMERA MODULE AND ELECTRONIC DEVICE

CROSS-REFERENCE TO RELATED APPLICATION(S)

The present application is a 371 application of International Patent Application No. PCT/CN2018/083045, filed on Apr. 13, 2018, which claims priority to Chinese Patent Application Serial No. 201710305888.3, filed on May 3, 2017. The entire contents of both of which are incorporated by reference in their entireties.

TECHNICAL FIELD

The present disclosure relates to a field of ambient light detection, and more particularly, to an image sensor, a camera module and an electronic device.

BACKGROUND

Current mobile phones usually include a front camera for taking a selfie and a light sensor for sensing an ambient-light brightness so as to adjust a brightness of a display screen according to the ambient-light brightness. However, the front camera and the light sensor are separately arranged in most of the present mobile phones, which results in a small proportion of space available for arranging the display screen, and hence a low screen-to-body ratio of the display screen of the mobile phone.

SUMMARY

Embodiments of the present disclosure provide an image sensor, a camera module and an electronic device.

The image sensor according to an embodiment of the present disclosure is used for the electronic device. The image sensor includes a pixel array and a control circuit. The pixel array includes a light sensing area and an imaging area. The control circuit is coupled to the pixel array and configured to receive a first instruction to control the light sensing area to detect an illumination intensity, and to receive a second instruction to control the light sensing area and the imaging area to sense light together for acquiring an image.

The camera module according to embodiments of the present disclosure includes an image sensor and an optical filter. The image includes a pixel array and a control circuit. The pixel array includes a first area and a second area. The control circuit is coupled to the pixel array and configured to control the first area to detect an illumination intensity according to a first instruction, and to control the first area and the second area to sense light together for acquiring an image according to a second instruction. The optical filter is arranged opposite to the pixel array, and is configured to be passed through by the light to allow the light to reach the first area and the second area.

The electronic device according to embodiments of the present disclosure includes a camera module and a processor. The camera module includes a pixel array, a control circuit and an optical filter. The pixel array includes a first area and a second area. The control circuit is coupled to the pixel array and configured to control the first area to detect an illumination intensity according to a first instruction, and to control the first area and the second area to sense light together for acquiring an image according to a second instruction. The optical filter is arranged opposite to the pixel array, and is configured to be passed through by the light to allow the light to reach the first area and the second area. The processor is connected to the control circuit. The processor is configured to generate the first instruction and the second instruction.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

The above and/or other additional aspects and advantages of embodiments of the present disclosure will become apparent and readily appreciated from the following descriptions made with reference to the drawings.

DETAILED DESCRIPTION

Embodiments of the present disclosure are further described with reference to the accompanying drawings. Same or similar reference signs represent the same or similar components or components that have the same or similar functions from beginning to end.

Moreover, the embodiments described below with reference to the accompanying drawings are exemplary, are merely used to explain the present disclosure, and cannot be construed as a limitation to the present disclosure.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "up", "above" and "on" the second feature may be that the first feature is directly above or obliquely above the second feature, or merely be that the first feature has a level higher than the second feature. The first feature "down", "below" and "under" the second feature may be that the first feature is directly below or obliquely below the second feature, or merely be that the first feature has a level less than the second feature.

Figure 1:
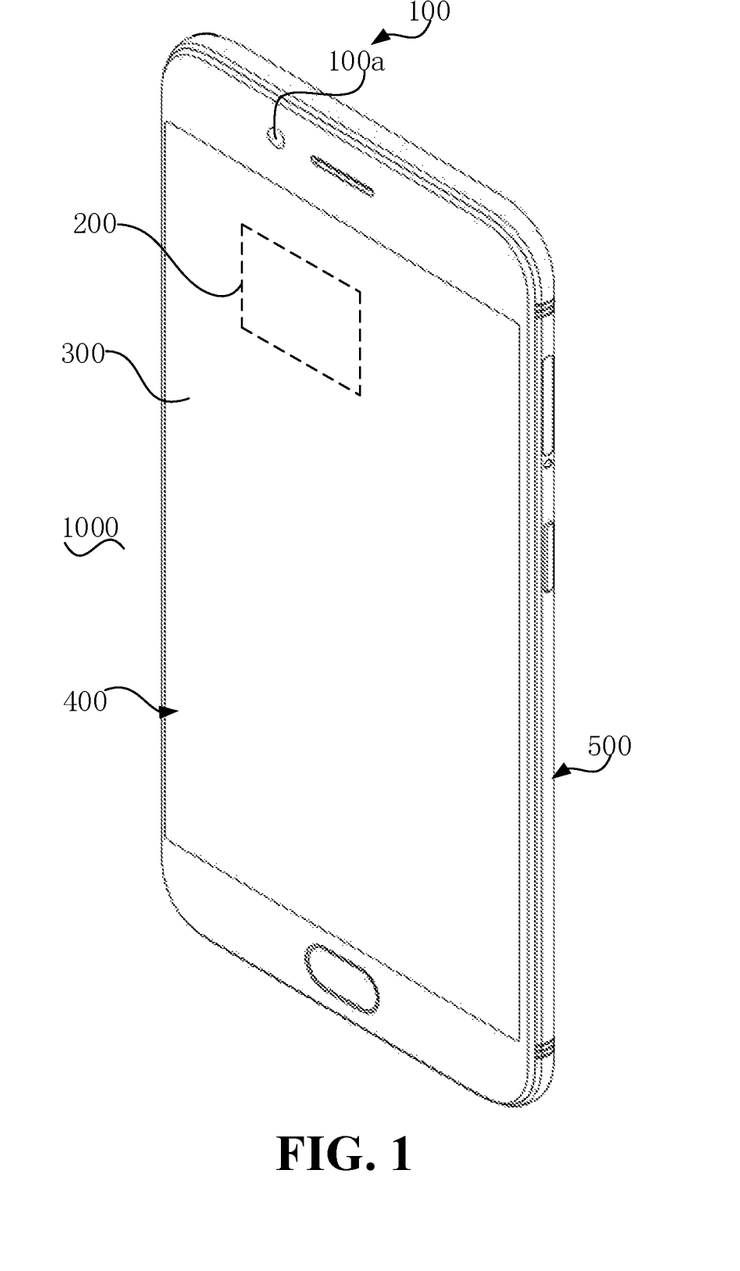
FIG. 1 is a perspective view of an electronic device according to an embodiment of the present disclosure.
Figure 2:
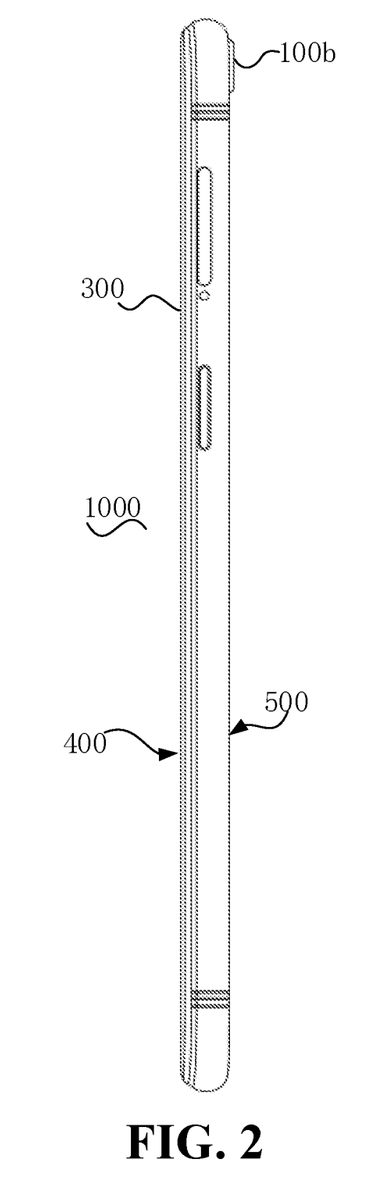
FIG. 2 is a side view of an electronic device according to an embodiment of the present disclosure.
Figure 3:
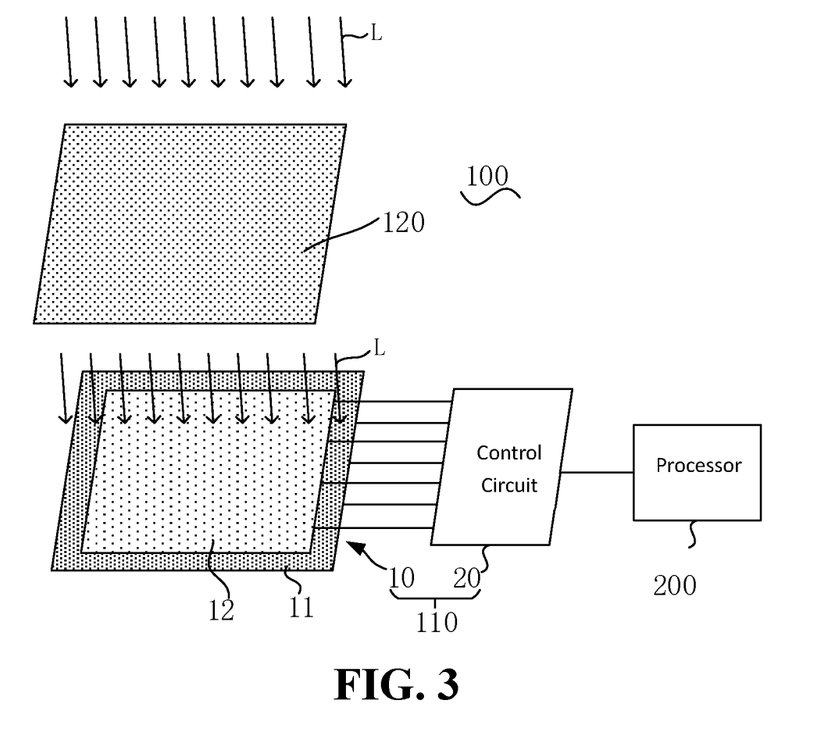
FIG. 3 is a schematic view of a camera module according to an embodiment of the present disclosure.

As illustrated in FIGS. 1-3, an image sensor 110 according to an embodiment of the present disclosure is used for an electronic device 1000. The electronic device 1000 includes a pixel array 10 and a control circuit 20. The pixel array 10 includes a light sensing area 11 and an imaging area 12. The control circuit 20 is configured to receive a first instruction to control the light sensing area 11 to detect an illumination intensity, and to receive a second instruction to control the light sensing area 11 and the imaging area 12 to sense lights together, so as to acquire an image.

The image sensor 110 according to an embodiment of the present disclosure may be applied to a camera module 100 according to an embodiment of the present disclosure. The camera module includes the image sensor 110 and an optical filter 120. The optical filter 120 is arranged opposite to the pixel array 10, and the light reaches the light sensing area 11 and the imaging area 12 of the pixel array 10 after passing through the optical filter 20.

The camera module 100 according to an embodiment of the present disclosure may be applied to the electronic device 1000 according to an embodiment of the present disclosure. The electronic device 1000 includes the camera module 100 and a processor 200. The processor 200 is connected to the control circuit 20. The processor 200 is configured to generate the first instruction and the second instruction.

In some embodiments of the present disclosure, when the processor 200 sends a first instruction to the control circuit 20, the control circuit 20 controls the light sensing area 11 to sense light according to the first instruction. Light L in a current scene arrives at each pixel of the light sensing area 11 after passing through the optical filter 120 above the light sensing area 11. A photosensitive device corresponding to each pixel in the light sensing area 11 generates a voltage change so as to acquire a pixel value corresponding to each pixel. The processor 20 calculates the illumination intensity based on a series of above pixel values.

After the processor 200 sends a second instruction to the control circuit 20, the control circuit 20 controls the light sensing area 11 and the imaging area 12 to sense light together according to the second control command. The light L in the current scene arrives at each pixel of the light sensing area 11 and the imaging area 12 after passing through the optical filter 120 above the light sensing area 11 and the imaging area 12. The photosensitive device corresponding to each pixel in the light sensing area 11 and the imaging area 12 generates a voltage change to obtain a pixel value corresponding to each pixel. The processor 200 performs interpolation, demosaicing and other processing based on a series of above pixel values, so as to obtain a final image.

In the image sensor 110, the camera module 100 and the electronic device 1000 according to an embodiment of the present disclosure, the light sensing area 11 and the imaging area 12 are integrated in one pixel array 10, so as to avoid providing one camera element and one light sensing element at the same time and hence to reduce the number of components. Thus, the proportion of space configured to arrange the display screen 300 therein is increased, and the screen-to-body ratio of the electronic device 1000 is improved. Moreover, the light sensing area 11 can assist the imaging area 11 in imaging so as to optimize the imaging effect.

In some embodiments, the optical filter 120 may be a RGB optical filter. The RGB optical filter may be arranged in a Bayer array so that the light L passes through the imaging area 12 to obtain a color image or passes through the light sensing area 11 and the imaging area 12 to obtain a color image, after passing through the optical filter 120.

Furthermore, in some embodiments, the optical filter 120 may be a visible light filter, and the optical filter 120 is arranged opposite to the pixel array 10. In this case, the light L passes through the optical filter 120 and then reaches the light sensing area 11 and the imaging area 12 of the pixel array 10. In this way, only a visible part of the light L reaches the light sensing area 11 and the imaging area 12 after the light L passes through the visible light filter, while the light in other wavelengths is blocked, in which the light sensing area 11 may be configured to detect the illumination intensity of the visible light, and also to acquire an image together with the imaging area 12, thus avoiding the interference of the invisible light in the light L and improving the accuracy of the photosensitivity monitoring and the quality of the image acquisition.

In some embodiments, the electronic device 1000 includes a single camera module 100, and the single camera module 100 is configured as a front camera module 100a. The front camera module 100a and the display screen 300 are arranged to a front face 400 of the electronic device 1000. The front camera module 100a may be configured to detect an illumination intensity on the front face 400 and obtain an image opposite to the front face 400.

As illustrated again in FIGS. 1-3, in some embodiments, the electronic device 1000 includes two camera modules 100, and the two camera modules 100 are configured as a front camera module 100a and a rear camera module 100b, respectively. The front camera module 100a and the display screen 300 are arranged to the front face 400 of the electronic device 1000, while the rear camera module 100b is arranged to a back face 500 of the electronic device 1000. The back face 500 faces away from the front face 400. The front camera module 100a may be configured to detect the illumination intensity on the front face 400 and obtain an image opposite to the front face 400. The rear camera module 100b may be configured to detect an illumination intensity on the back face 500 and obtain an image opposite to the back face 500.

As illustrated in Table 1, in the front camera module 100a or the rear camera module 100b, each light sensing area 11 has three operation modes, namely a light sensing mode, an imaging mode and a standby mode, and each imaging area 12 has two operation modes, namely an imaging mode and a standby mode. That is, a combination of the operation modes of the front camera module 100a and the rear camera module 100b includes following nine cases in Table 1.

The imaging mode refers to a mode in which the light sensing area 11 and the imaging area 12 of the camera module 100 are used for imaging together. The light sensing mode refers to a mode in which the light sensing area 11 of the camera module 100 is used to detect the illumination intensity. The standby mode refers to a mode in which the imaging area 12 of the camera module 100 is not used for imaging, and the light sensing area 11 of the camera module 100 is not used for detecting the illumination intensity and imaging.

TABLE 1

| | Component | | | |
|---|---|---|---|---|
| | Front Camera Module Image Sensor | | Rear Camera Module Image Sensor | |
| Serial Number | Light Sensing Area | Imaging Area | Light Sensing Area | Imaging Area |
| | | Operation Mode | | |
| 1 | Light Sensing Mode | Standby Mode | Light Sensing Mode | Standby Mode |
| 2 | Light Sensing Mode | Standby Mode | Standby Mode | Standby Mode |
| 3 | Standby Mode | Standby Mode | Light Sensing Mode | Standby Mode |
| 4 | Light Sensing Mode | Standby Mode | Imaging Mode | Imaging Mode |
| 5 | Standby Mode | Standby Mode | Imaging Mode | Imaging Mode |
| 6 | Imaging Mode | Imaging Mode | Light Sensing Mode | Standby Mode |
| 7 | Imaging Mode | Imaging Mode | Standby Mode | Standby Mode |
| 8 | Imaging Mode | Imaging Mode | Imaging Mode | Imaging Mode |
| 9 | Standby Mode | Standby Mode | Standby Mode | Standby Mode |

Thus, in the process of using the electronic device 1000, the electronic device 1000 can control a display brightness of the display screen 300 according to a front-face illumination intensity detected by the front camera module 100*a* and a back-face illumination intensity detected by the rear camera module 100*b* simultaneously. Taking the electronic device 1000 which is a mobile phone as an example, a large difference may exist between the illumination intensities on the front face 400 and the back face 500 of the electronic device 1000 when a user uses the electronic device 1000. For example, the user may place the mobile phone whose front face faces downwards on a desktop. If the display brightness of the display screen 300 is controlled only according to the front-face illumination intensity detected by the front camera module 100*a*, the display screen 300 may be in a non-display state or in a state with a very low display brightness. When the user suddenly picks up the electronic device 1000 and uses it again, the electronic device 1000 needs to rewake up the display screen 300 or turn the brightness of the display screen 300 up in a short time. When the user frequently picks it up and drops it down, the electronic device 1000 consumes much electric energy to control the switching operation of the brightness of the display screen 300. The electronic device 1000 according to an embodiment of the present disclosure can also detect the back-face illumination intensity of the electronic device 1000. When the user places the mobile phone whose front face faces downwards on the desktop, the display screen 300 can display with the brightness corresponding to the back-face illumination intensity within a certain time range, and when the user re-picks up the electronic device 1000 and uses it, the display brightness of the display screen 300 does not need to switch, which facilitates the usage and saves the electric energy.

In other operation modes illustrated in Table 1, the front camera module 100*a* and the rear camera module 100*b* may detect the illumination intensity, respectively, so as to obtain the front-face illumination intensity and the back-face illumination intensity (for example, in operation mode 1 illustrated in Table 1), and then the processor 200 may select a larger illumination intensity from the front-face illumination intensity and the back-face illumination intensity as a final illumination intensity. The final illumination intensity may serve as a basis to adjust the display brightness of display screen 300. For example, when the user lies down indoors and operates the electronic device 1000, the back face 500 may face towards a ceiling light source (such as a chandelier), such that the back-face illumination intensity is larger than the front-face illumination intensity. In this case, the electronic device 1000 can adjust the display brightness of the display screen 300 according to the back-face illumination intensity, which facilitates the user to see the displayed content clearly and relieve the eye fatigue.

In some other operation modes illustrated in Table 1, when the front camera module 100*a* is in the imaging mode and the rear camera module 100*b* is in the light sensing mode (for example, in operation mode 6 illustrated in Table 1), the back-face illumination intensity detected by the light sensing area 11 of the rear camera module 100*b* is used as the final illumination intensity of the electronic device 1000. When the front camera module 100*a* is in the light sensing mode and the rear camera module 100*b* is in the imaging mode (for example, in operation mode 4 illustrated in Table 1), the front-face illumination intensity detected by the light sensing area 11 of the front camera module 100*a* is used as the final illumination intensity of the electronic device 1000. In this way, when the electronic device 1000 is used for imaging, the brightness of the display screen 300 can also change accordingly along with a change of the ambient brightness, which is conducive to the preview when the user shoots and thus improves the user experience.

The electronic device 1000 may be a mobile phone, a tablet computer or a notebook computer, which is not limited herein. The electronic device 1000 according to an embodiment of the present disclosure is described by taking the mobile phone as an example. The illumination intensity acquired by the image sensor 110 or the camera module 100 can be used as a basis for adjusting the display brightness of the display screen 300 of the electronic device 1000. For example, when the illumination intensity is high, the display brightness of the display screen 300 is increased, or when the illumination intensity changes from a large value to a value that is less than a certain threshold, it is determined that the user is answering a phone and thus the display screen 300 is turned off. The image acquired by the image sensor 110 or the camera module 110 may be displayed in the display screen 300 or be stored in the storage medium of the electronic device 1000 to be read or dumped.

The processor 200 is configured to generate the first instruction and the second instruction. In addition, the processor 200 sends the first instruction and the second instruction to the control circuit 20. In some embodiments of the present disclosure, the processor 200 can generate and send the first instruction separately, or generate and send the second instruction separately. The first instruction and the second instruction may be generated when the processor 200 receives an input operation, and the input operation may be an operation input by the user or an input of an application environment. For example, in the mobile phone according to an embodiment of the present disclosure, the first instruction and the second instruction may be generated by the processor after the processor receives an operation of touching or pressing a specified function key of the mobile phone by the user. The first instruction and the second instruction may also be generated by the processor 200 when the system time of the mobile phone reaches a predetermined time point.

The control circuit 20 may be configured to receive the first instruction separately to control the light sensing area 11 to detect the illumination intensity, or to receive the second instruction separately to control the light sensing area 11 and the imaging area 12 to acquire an image together. When the control circuit 14 does not receive the first instruction or the second instruction, both the light sensing area 11 and the imaging area 12 are in the standby state. In some embodiments of the present disclosure, the pixel array 10 includes a plurality of pixels arranged in an array. The pixels located in the imaging area 12 are configured to obtain an image, and the pixels located in the light sensing area 11 are configured to detect the illumination intensity, or to obtain an image together with the imaging area 12. Each pixel of the pixel array 10 can generate a corresponding voltage change according to the illumination intensity of the light arriving at the pixel. The control circuit 20 is electrically connected to each pixel. The control circuit 20 obtains the voltage change generated by the corresponding pixel according to the received first or second instruction, and further obtains the illumination intensity of the light arriving at the pixel through analyzing the value of the voltage change by the processing of the processor 200, or further obtains the image through comprehensively analyzing the illumination intensity of the light arriving at multiple pixels by the processor 200.

In some embodiments, the control circuit 20 is further configured to receive the second instruction to control the light sensing area 11 to sense light so as to detect a color temperature information of the current scene, and also configured to control the imaging area 12 to sense light according to the color temperature information so as to obtain a color-temperature adjusted image.

In some embodiments of the present disclosure, the optical filter 120 is arranged above the light sensing area 11 and the imaging area 12. The embodiment of the present disclosure is described by taking a RGB color filter as an example. When the control circuit 20 receives the first instruction, the control circuit 20 firstly controls the light sensing area 11 to sense light. The light of the current scene reaches each pixel of the light sensing area 11 after passing through the RGB optical filter above the light sensing area 11. The photosensitive device corresponding to each pixel in the light sensing area 11 generates a voltage change to obtain a red pixel value, a blue pixel value or a green pixel value corresponding to each pixel. The processor 200 detects the color temperature information of the current scene by analyzing the above red pixel value, blue pixel value or green pixel value. The color temperature information of the current scene reflects respective gain values of three colors of R, G and B in the light of the current scene. Subsequently, the control circuit 20 controls each pixel of the imaging area 12 to perform photosensitive imaging so as to obtain multiple pixel values. The processor 20 adjusts the gain values of overall R, G, B of the imaging area 12 according to the detected color temperature information, and then performs interpolation and demosaicing, so that the final color-temperature adjusted image is closer to an actual color of each object in the current scene. In this way, the captured image is prevented from encountering a problem of color cast. In particular, when the electronic device 1000 is used for night shot, the supplementary light is usually necessary as the light in the night environment is dark. However, the light emitted by the current fill light usually affects the color temperature value in the current environment, so it is more necessary for the light sensing area 11 to detect the color temperature information for auxiliary imaging, so as to optimize the imaging effect.

In some embodiments, the control circuit 20 is further configured to receive the second instruction to control the light sensing area 11 and the imaging area 12 to sense light together to acquire a merged image.

In some embodiments of the present disclosure, the optical filter 120 is arranged above the light sensing area 11 and the imaging area 12. The embodiment of the present disclosure is described by taking the RGB color filter as an example. When the control circuit 20 receives the second instruction, the light of the current scene reaches each pixel of the light sensing area 11 and the imaging area 12 after passing through the RGB optical filter above the light sensing area 11 and the imaging area 12. Each pixel of the light sensing area 11 and the imaging area 12 can obtain the corresponding red pixel value, blue pixel value or green pixel value. Then, the merged image can be obtained by perform interpolation, demosaicing and other processing on each pixel value. The merged image refers to an image obtained by the common imaging of the light sensing area 11 and the imaging area 12. In this way, the area of the final image can be expanded and the imaging effect can be optimized with the pixels of the light sensing area 11 being added for imaging.

In some embodiments, a ratio of an area of the imaging area 12 to an area of the pixel array 10 is greater than or equal to 0.6, and/or a ratio of an area of the light sensing area 11 to an area of the pixel array 10 is greater than or equal to 0.1. In some embodiments of the present disclosure, the ratio of the area of the imaging area 12 to the area of the pixel array 10 may be 0.6, 0.68, 0.74, 0.8, 0.9, etc. The ratio of the area of the light sensing area 11 to the area of the pixel array 10 may be 0.1, 0.23, 0.3, 0.4, etc. In this way, on the basis of ensuring the image sensor 110 to have a function of detecting the illumination intensity, the image sensor 110 also has a good imagining effect.

Figure 4:
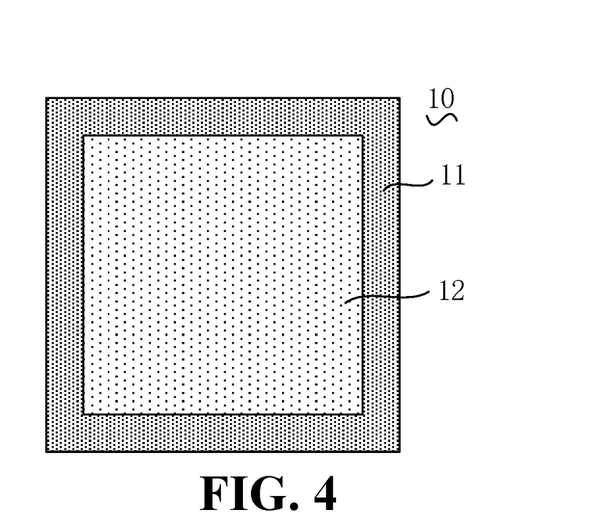
FIG. 4 is a plan view of a pixel array according to an embodiment of the present disclosure.
Figure 5:
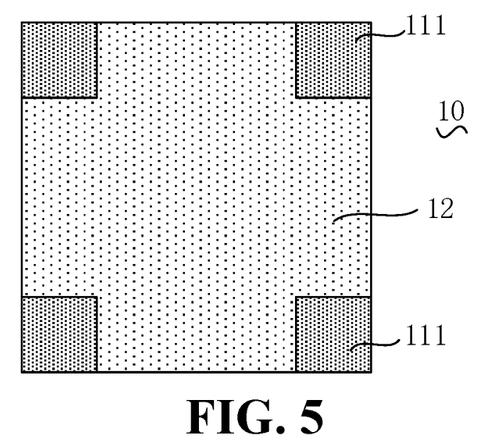
FIG. 5 is a plan view of a pixel array according to an embodiment of the present disclosure.

As illustrated in FIG. 4 and FIG. 5, in some embodiments, the imaging area 12 is continuously distributed and located in a center of the pixel array 10, and the light sensing area 11 is located at a periphery of the imaging area 12. Thus, the continuous distribution of the imaging area 12 facilitates generation of a continuous and complete image. In some embodiments of the present disclosure, a center of the imaging area 12 may coincide with the center of the pixel array 10. The imaging area 12 may be centrally symmetrical, and the light sensing area 11 may be located on one or more sides of the imaging area 12.

In some embodiments, the light sensing area 11 includes a plurality of sub light sensing areas 111, and the plurality of sub light sensing areas 111 have equal areas and are spaced apart from one another. It should be understood that the final illumination intensity detected by the light sensing area 11 needs to obtained with comprehensively considering the illumination intensities detected by all the pixels in the light sensing area 11. Therefore, in order to obtain an objective environment illumination intensity, the light sensing area 11 should be arranged as dispersive as possible. That is, the light sensing area 11 may be dispersed into the plurality of sub light sensing areas 111 spaced apart from one another.

In this way, the plurality of sub light sensing areas 111 are spaced apart from one another to expand a detection range of the light sensing area 11 and also improve a detection accuracy of the light sensing area 11. In one embodiment, the number of the sub light sensing areas 111 is four, and a ratio of an area of each sub light sensing area 111 to that of the pixel array 10 may be 0.05. The plurality of sub light sensing areas 111 may be distributed on an upper side, a lower side, a left side and a right side of the imaging area 12, respectively.

In addition, for the pixel array 10 illustrated in FIG. 5, when the light sensing area 11 and the imaging area 12 acquire the merged image together, the merged image obtained is a usual square image. When the imaging area 12 images alone, the obtained image is a "cross-shaped" image. In this way, when the user takes photos with the electronic device 1000, the user can achieve the acquisition of the square image, and also the acquisition of the "cross-shaped" image, which meets the user's individualized requirement and upgrades the user's experience.

Figure 6:
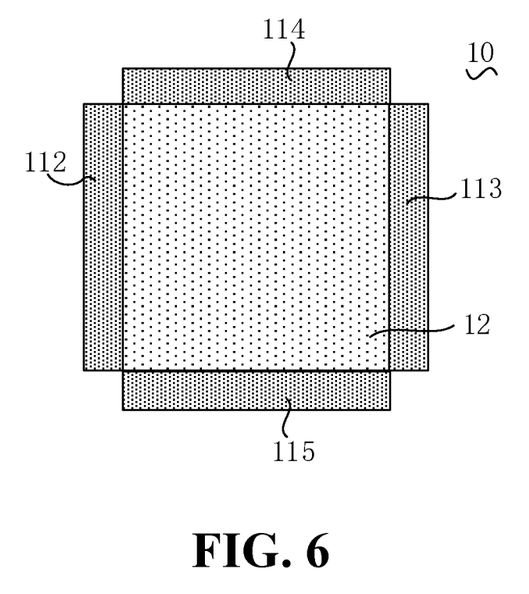
FIG. 6 is a plan view of a pixel array according to an embodiment of the present disclosure.

In some embodiments of the present disclosure, as illustrated in FIG. 6, in some embodiments, the sub light sensing area 111 includes a left light sensing area 112 and a right light sensing area 113. The left light sensing area 112 is arranged on the left side of the imaging area 12, and the right light sensing area 113 is arranged on the right side of the imaging area 12. The left light sensing area 112 and the right light sensing area 113 are arranged symmetrically. The left light sensing area 112 detects a left illumination intensity, and the right light sensing area 113 detects a right illumination intensity. The illumination intensity detected by the light sensing area 11 is an average value of the left illumination intensity and the right illumination intensity.

In this way, the left light sensing area 112 and the right light sensing area 113 have a substantially same influence on the final illumination intensity detected by the light sensing area 11, such that it is avoided that an inaccurate overall detection result is caused as the light sensing area 11 is too sensitive to a light change on the left side or the right side of the imaging area 12.

In some embodiments, the sub light sensing area 111 includes an upper light sensing area 114 and a lower light sensing area 115. The upper light sensing area 114 is arranged on the upper side of the imaging area 12, and the lower light sensing area 115 is arranged on the lower side of the imaging area 12. The upper light sensing area 114 and the lower light sensing area 115 are arranged symmetrically. The upper light sensing area 114 detects an upper illumination intensity, and the lower light sensing area 115 detects a lower illumination intensity. The illumination intensity detected by the light sensing area 11 is an average value of the upper illumination intensity and the lower illumination intensity.

In this way, the upper light sensing area 114 and the lower light sensing area 115 have a substantially same influence on the final illumination intensity detected by the light sensing area 11, such that it is avoided that an inaccurate overall detection result is caused as the light sensing area 11 is too sensitive to a light change on the upper side or the lower side of the imaging area 12.

In some embodiments, the sub light sensing area 111 includes the left light sensing area 112, the right light sensing area 113, the upper light sensing area 114 and the lower light sensing area 115 aforementioned. In some embodiments of the present disclosure, the left light sensing area 112, the right light sensing area 113, the upper light sensing area 114 and the lower light sensing area 115 are distributed centrosymmetrically. The left light sensing area 112 and the right light sensing area 113 are distributed symmetrically, and the upper light sensing area 114 and the lower light sensing area 115 are distributed symmetrically. The left light sensing area 112 detects the left illumination intensity, and the right light sensing area 113 detects the right illumination intensity. The upper light sensing area 114 detects the upper illumination intensity, and the lower light sensing area 115 detects the lower illumination intensity. The illumination intensity detected by the light sensing area 11 is an average value of the left illumination intensity, the right illumination intensity, the upper illumination intensity and the lower illumination intensity.

In this way, the left light sensing area 112, the right light sensing area 113, the upper light sensing area 114 and the lower light sensing area 115 have a substantially same influence on the final illumination intensity detected by the light sensing area 11, such that it is avoided that an inaccurate overall detection result is caused as the light sensing area 11 is too sensitive to a light change on the left side, the right side, the upper side or the lower side of the imaging area 12.

It should be noted that the above symmetrical distribution refers to symmetrical distributions of both area and shape with respect to the imaging area 12.

In this way, the left light sensing area 112, the right light sensing area 113, the upper light sensing area 114 and the lower light sensing area 115 can sense the light in multiple directions on the left side, the right side, the upper side and the lower side of the imaging area 12 simultaneously, so as to improve the accuracy of the detection result of the light sensing area 11.

For the pixel array 10 illustrated in FIG. 6, when the light sensing area 11 and the imaging area 12 acquire the merged image together, the merged image obtained is a "cross-shaped" image. The added light sensing area 11 can acquire more information in the current scene. Thus, an acquisition field of view of the merged image is expanded and the imaging effect is optimized. In this way, when the user takes photos with the electronic device 1000, the user can achieve the acquisition of the "cross-shaped" image, which meets the user's individualized requirement and upgrades the user's experience.

Figure 7:
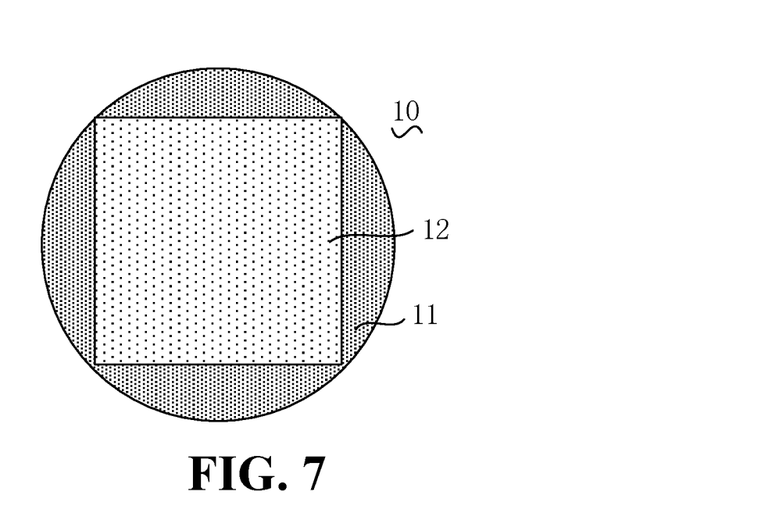
FIG. 7 is a plan view of a pixel array according to an embodiment of the present disclosure.
Figure 8:
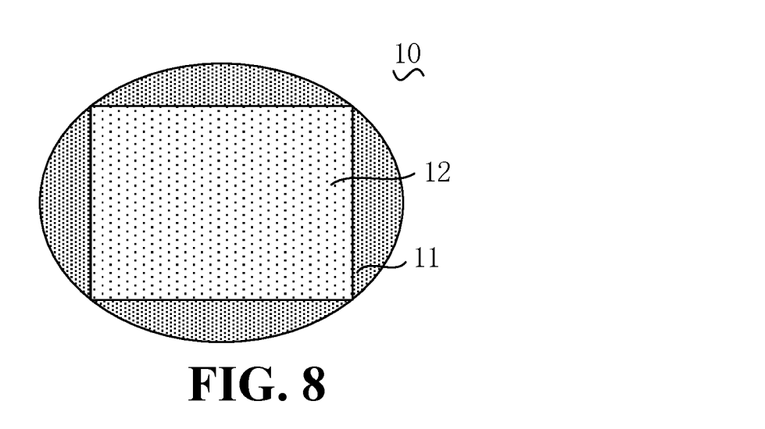
FIG. 8 is a plan view of a pixel array according to an embodiment of the present disclosure.

As also illustrated in FIGS. 7-8, in some embodiments, the pixel array 10 has a circular or elliptical shape. The imaging area 12 have a rectangular shape inscribed within the pixel array 10, and an area of the circular or elliptical pixel array 10 other than the inscribed rectangular imaging area 12 is the light sensing area 11.

In this way, the imaging area 12 is arranged in the center of the pixel array 10, so it is easy to obtain the image. The light sensing area 11 is arranged dispersively. The light sensing area 11 on the left side of the imaging area 12 and the light sensing area 11 on the right side of the imaging area 12 are symmetrical, such that the light sensing area 11 has the same sensitivity degree to the light changes on the left side and the right side of the imaging area 12. Moreover, the light sensing area 11 on the upper side of the imaging area 12 and the light sensing area 11 on the lower side of the imaging area 12 are symmetrical, such that the light sensing area 11 has the same sensitivity degree to the light changes on the upper side and the lower side of the imaging area 12. Thus, the detection result of the light sensing area 11 is accurate.

Figure 9:
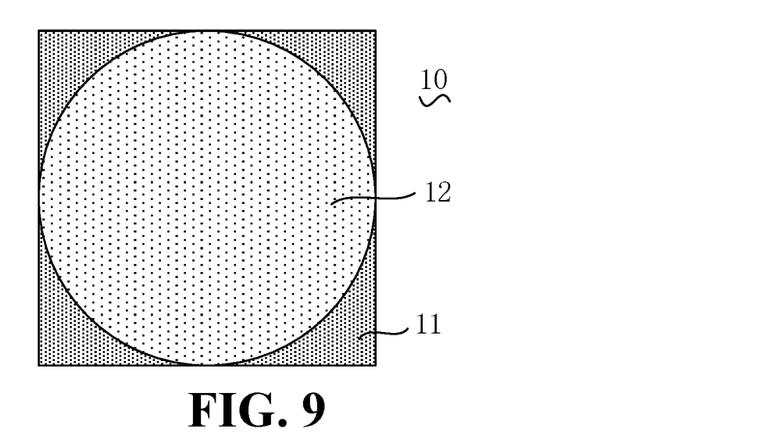
FIG. 9 is a plan view of a pixel array according to an embodiment of the present disclosure.
Figure 10:
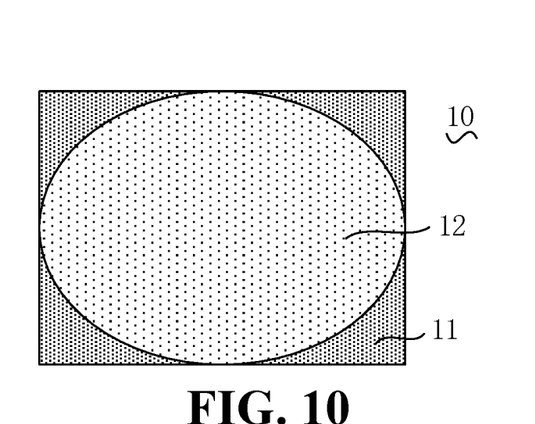
FIG. 10 is a plan view of a pixel array according to an embodiment of the present disclosure.

As also illustrated in FIGS. 9 and 10, the pixel array 10 has a rectangular shape. The imaging area 12 has a circular or elliptical shape inscribed within the rectangle, and an area of the rectangular pixel array 10 other than the inscribed circular or elliptical imaging area 12 is the light sensing area 11.

In this way, the shape of the imaging area 12 is circular or elliptical, such that the user can obtain a circular or elliptical image directly through the imaging area 12 without post-processing operations of the image, which meets the user's individualized requirement. Moreover, the light sensing area 11 is arranged dispersively, which improves the accuracy of the illumination intensity detected by the light sensing area 11.

In this way, the imaging area 12 is arranged in the center of the pixel array 10, so it is easy to obtain the image. Moreover, the light sensing area 11 on the left side of the imaging area 12 and the light sensing area 11 on the right side of the imaging area 12 are symmetrical, and the light sensing area 11 on the upper side of the imaging area 12 and the light sensing area 11 on the lower side of the imaging area 12 are symmetrical.

Figure 11:
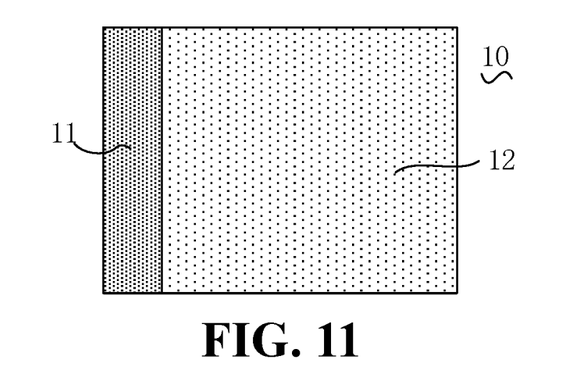
FIG. 11 is a plan view of a pixel array according to an embodiment of the present disclosure.
Figure 12:
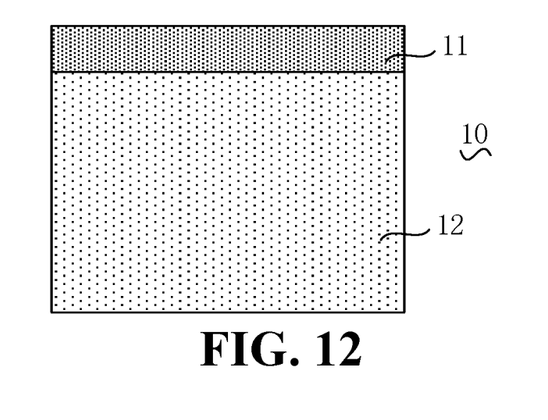
FIG. 12 is a plan view of a pixel array according to an embodiment of the present disclosure.

As also illustrated in FIGS. 11 and 12, in some embodiments, the imaging area 12 is continuously distributed, and the light sensing area 11 is also continuously distributed. The imaging area 12 and the light sensing area 11 are separated by a straight line. Thus, the structure of the pixel array 10 is simple, and the control circuit 20 can easily find the corresponding pixels in the imaging area 12 or the light sensing area 11 after receiving the first instruction or the second instruction. In some embodiments of the present disclosure, in one embodiment, the ratio of the area of the imaging area 12 to the area of the pixel array 10 is 0.8, and the ratio of the area of the light sensing area 11 to the area of the pixel array 10 is 0.2. The imaging area 12 may be rectangular so that the imaging area 12 can acquire a rectangular image, and the light sensing area 11 can also be rectangular. A long side of the light sensing area 11 may intersect with a long side of the imaging area 12, or the long side of the light sensing area 11 may intersect with a short side of the imaging area 12.

Reference throughout this specification to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means at least two, such as two, three and so on, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the implementations may not be in the order illustrated or discussed. For example, functions are performed in a substantially simultaneous manner or in a reverse order according to the functions involved, which should be understood by those skilled in the art of embodiments of the present disclosure.

The logic and/or step described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

The invention claimed is:

1. An electronic device, comprising:
    a camera module comprising:
        a pixel array comprising a light sensing area and an imaging area;
        a control circuit coupled to the pixel array and configured to:
            control the light sensing area to detect an illumination intensity according to a first instruction; and
            control the light sensing area and the imaging area to sense light together for acquiring an image according to a second instruction; and
        an optical filter arranged opposite to the pixel array, and configured to be passed through by the light to allow the light to reach the light sensing area and the imaging area; and
    a processor connected to the control circuit, and configured to generate the first instruction and the second instruction,
    wherein two camera modules are provided, one of the two camera modules is a front camera module, and the other one of the two camera modules is a rear camera module, and
    wherein when the light sensing area of the front camera module detects the illumination intensity to obtain a front-face illumination intensity and the light sensing area of the rear camera module detects the illumination intensity to obtain a back-face illumination intensity, the processor is configured to select a larger illumination intensity from the front-face illumination intensity and the back-face illumination intensity as a final illumination intensity.

2. The electronic device according to claim 1, wherein the control circuit is further configured to:
    receive the second instruction to control the light sensing area to sense light so as to detect a color temperature information of a current scene; and
    control the imaging area to sense light according to the color temperature information so as to obtain a color-temperature adjusted image.

3. The electronic device according to claim 1, wherein the control circuit is further configured to:
    receive the second instruction to control the light sensing area and the imaging area to sense light together to acquire a merged image.

4. The electronic device according to claim 1, wherein the imaging area is continuously distributed and arranged in a center of the pixel array, and the light sensing area is arranged at a periphery of the imaging area.

5. The electronic device according to claim 4, wherein the light sensing area comprises a plurality of sub light sensing areas, and the plurality of sub light sensing areas have equal areas and are spaced apart from one another.

6. The electronic device according to claim 5, wherein the plurality of sub light sensing areas comprise a left light sensing area on a left side of the imaging area and a right light sensing area on a right side of the imaging area, the left light sensing area and the right light sensing area are symmetrical, the left light sensing area detects a left illumination intensity, the right light sensing area detects a right illumination intensity, and the illumination intensity detected by the light sensing area is an average value of the left illumination intensity and the right illumination intensity.

7. The electronic device according to claim 5, wherein the plurality of sub light sensing areas comprise an upper light sensing area on an upper side of the imaging area and a lower light sensing area on a lower side of the imaging area, the upper light sensing area and the lower light sensing area are symmetrical, the upper light sensing area detects an upper illumination intensity, the lower light sensing area detects a lower illumination intensity, and the illumination intensity detected by the light sensing area is an average value of the upper illumination intensity and the lower illumination intensity.

8. The electronic device according to claim 5, wherein the plurality of sub light sensing areas comprise a left light sensing area on a left side of the imaging area, a right light sensing area on a right side of the imaging area, an upper light sensing area on an upper side of the imaging area and a lower light sensing area on a lower side of the imaging area, the left light sensing area and the right light sensing area are symmetrical, the upper light sensing area and the lower light sensing area are symmetrical, the left light sensing area detects a left illumination intensity, the right light sensing area detects a right illumination intensity, the upper light sensing area detects an upper illumination intensity, the lower light sensing area detects a lower illumination intensity, and the illumination intensity detected by the light sensing area is an average value of the left illumination intensity, the right illumination intensity, the upper illumination intensity and the lower illumination intensity.

9. The electronic device according to claim 1, wherein the pixel array has a circular or elliptical shape, the imaging area has a rectangular shape inscribed within the pixel array, and an area of the circular or elliptical pixel array other than the inscribed rectangular imaging area is the light sensing area.

10. The electronic device according to claim 1, wherein the imaging area is continuously distributed, the light sensing area is continuously distributed, and the imaging area and the light sensing area are separated by a straight line.

11. The electronic device according to claim 1, wherein a ratio of an area of the imaging area to an area of the pixel array is greater than or equal to 0.6.

12. The electronic device according to claim 1, wherein the optical filter comprises a RGB optical filter.

13. The electronic device according to claim 1, wherein the pixel array has a rectangular shape, the imaging area has a circular or elliptical shape inscribed within the rectangular pixel array, and an area of the rectangular pixel array other than the inscribed circular or elliptical imaging area is the light sensing area.

14. The electronic device according to claim 1, wherein a ratio of an area of the light sensing area to the area of the pixel array is greater than or equal to 0.1.

15. The electronic device according to claim 1, wherein a ratio of an area of the imaging area to an area of the pixel array is greater than or equal to 0.6, and a ratio of an area of the light sensing area to the area of the pixel array is greater than or equal to 0.1.

16. An electronic device, comprising:
a camera module comprising:
- a pixel array comprising a light sensing area and an imaging area;
- a control circuit coupled to the pixel array and configured to:
  - control the light sensing area to detect an illumination intensity according to a first instruction; and
  - control the light sensing area and the imaging area to sense light together for acquiring an image according to a second instruction; and
- an optical filter arranged opposite to the pixel array, and configured to be passed through by the light to allow the light to reach the light sensing area and the imaging area; and
a processor connected to the control circuit, and configured to generate the first instruction and the second instruction,
wherein two camera modules are provided, one of the two camera modules is a front camera module, and the other one of the two camera modules is a rear camera module,
wherein when the front camera module is in an imaging mode and the rear camera module is in a light sensing mode, the light sensing area of the rear camera module detects the illumination intensity to obtain a back-face illumination intensity, and the processor is configured to select the back-face illumination intensity as a final illumination intensity, and
wherein when the front camera module is in a light sensing mode and the rear camera module is in an imaging mode, the light sensing area of the front camera module detects the illumination intensity to obtain a front-face illumination intensity, and the processor is configured to select the front-face illumination intensity as a final illumination intensity.

* * * * *